(12) United States Patent
Ben Ami et al.

(10) Patent No.: US 9,590,764 B2
(45) Date of Patent: Mar. 7, 2017

(54) LTE TRANSMISSION MASK ADJUSTMENT TO MAXIMIZE PERFORMANCE AND REDUCE INTERFERENCE

(71) Applicant: Texas Instruments Incorporated, Dallas, TX (US)

(72) Inventors: Alon Ben Ami, Gedera (IL); Shlomit Ben Yakar, Hod Hasharon (IL); Alon Paycher, Moshav Beit Hananya (IL); Uri Weinrib, Flumnek (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 35 days.

(21) Appl. No.: 14/486,799

(22) Filed: Sep. 15, 2014

(65) Prior Publication Data
US 2016/0080108 A1 Mar. 17, 2016

(51) Int. Cl.
H04W 88/04 (2009.01)
H04W 84/12 (2009.01)
H04L 1/00 (2006.01)
H04W 72/08 (2009.01)

(52) U.S. Cl.
CPC ......... *H04L 1/0026* (2013.01); *H04W 72/085* (2013.01)

(58) Field of Classification Search
CPC ... H04W 240/00; H04W 80/04; H04W 88/04; H04W 84/12; H04W 36/30; H04W 84/18; H04W 74/08
See application file for complete search history.

(56) References Cited

U.S. PATENT DOCUMENTS

| | | | | |
|---|---|---|---|---|
| 8,914,019 B1* | 12/2014 | Choi | ................... | H04W 72/048 455/422.1 |
| 2012/0087341 A1* | 4/2012 | Jang | ...................... | H04W 28/04 370/331 |
| 2012/0252442 A1* | 10/2012 | Fu | ......................... | H04W 24/10 455/426.1 |
| 2012/0307869 A1* | 12/2012 | Charbit | ................. | H04B 1/715 375/132 |
| 2012/0327883 A1* | 12/2012 | Yang | ..................... | H04L 1/0026 370/329 |
| 2013/0034001 A1* | 2/2013 | Mizusawa | ............. | H04W 16/14 370/252 |

(Continued)

FOREIGN PATENT DOCUMENTS

| | | |
|---|---|---|
| WO | 2005062535 | 7/2005 |
| WO | 2006069401 | 6/2006 |
| WO | 2012128886 | 9/2012 |

*Primary Examiner* — Andrew Lee
(74) *Attorney, Agent, or Firm* — Kenneth Liu; Charles A. Brill; Frank D. Cimino

(57) ABSTRACT

System and methods for using channel quality reports to reduce inter-band interference are disclosed. Channel information is received at a first wireless communication device from a second wireless communication device. The first wireless device is operating in a first frequency range, and the second wireless device is operating in a second frequency range. The first frequency range is adjacent to the second frequency range. A channel quality report is generated at the first wireless communication device. The channel quality report indicates that particular sub-bands in the first frequency range have low channel quality. The particular sub-bands are selected using the channel information.

18 Claims, 3 Drawing Sheets

(56) References Cited

U.S. PATENT DOCUMENTS

| | | | |
|---|---|---|---|
| 2013/0196648 A1* | 8/2013 | Immonen | H04W 52/243 455/422.1 |
| 2013/0324172 A1* | 12/2013 | Ahn | H04W 24/02 455/501 |
| 2014/0016498 A1* | 1/2014 | Sharma | H04W 16/14 370/252 |
| 2014/0023032 A1* | 1/2014 | Kim | H04W 74/0833 370/329 |
| 2014/0056276 A1* | 2/2014 | Behnamfar | H04W 72/1215 370/330 |
| 2014/0120969 A1* | 5/2014 | Sang | H04B 1/406 455/501 |
| 2015/0271829 A1* | 9/2015 | Amini | H04W 24/02 370/329 |
| 2015/0296516 A1* | 10/2015 | Jung | H04W 72/02 370/312 |

* cited by examiner

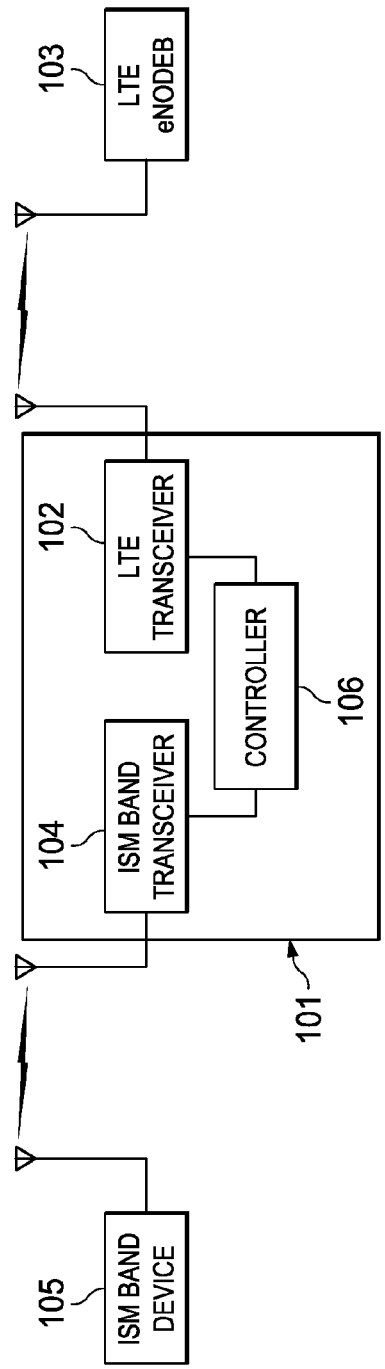
FIG. 1
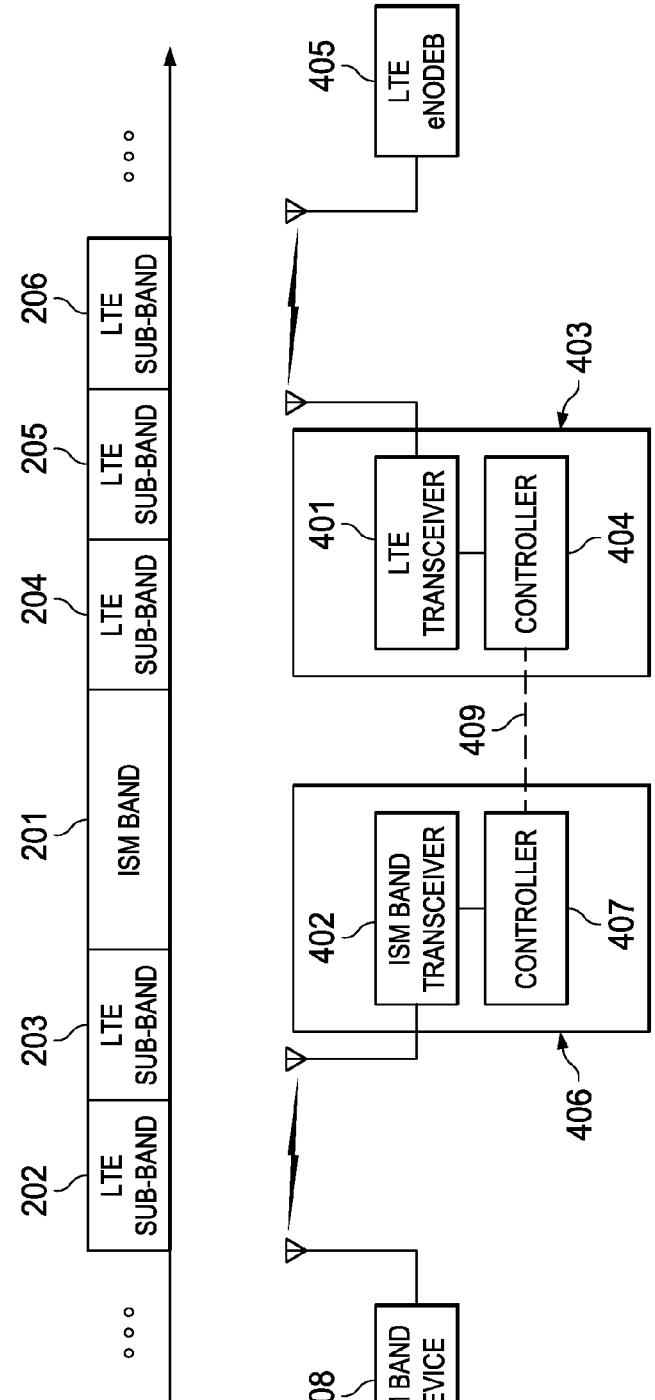
FIG. 2
FIG. 4

LTE TRANSMISSION MASK ADJUSTMENT TO MAXIMIZE PERFORMANCE AND REDUCE INTERFERENCE

BACKGROUND

The Industrial, Scientific and Medical (ISM) radio bands include portions of the radio spectrum that are reserved internationally for the use of radio frequency (RF) transmissions for industrial, scientific and medical purposes. Generally, there is no regulatory protection from ISM device operation and equipment operating in the ISM bands must tolerate any interference generated by ISM equipment. Although these bands were originally not intended for telecommunications, in recent years the ISM bands have been used for short-range, low power communications systems, such as cordless phones, Bluetooth devices, near field communication (NFC) devices, and wireless computer networks, that use frequencies in the ISM band as well as other frequencies allocated to low power communications.

For example, the IEEE 802.11 Wi-Fi standards identify the channels that may be used for a Wireless Local Area Network (WLAN). The 2.4 GHz ISM band is from 2400 MHz-2500 MHz. There are fourteen channels defined for use by 802.11 Wi-Fi for the 2.4 GHz ISM band. These 802.11 channels span 2402 MHz-2483 MHz. 802.11 Wi-Fi is adapted for use within unlicensed spectrum, which enables users to access the radio spectrum without the need for the regulations and restrictions; however this spectrum is also shared by many other users and is exposed to interference.

Devices using the Bluetooth wireless technology standard also operate in the 2.4 GHz ISM band at 2.4 GHz-2.485 GHz. Bluetooth devices are used in short-range personal area networks. To reduce interference with other protocols that use the 2.4 GHz ISM band, the Bluetooth protocol divides the band into seventy-nine channels and changes channels many times per second. Bluetooth devices may also detect existing signals in the ISM band and attempt to avoid them by negotiating a channel map with other Bluetooth devices.

Long Term Evolution (LTE) cellular networks operate in a number of assigned bands, including the bands 2300 MHz-2400 MHz and 2500 MHz-2690 MHz, which are adjacent to both sides of the ISM band.

The transmissions by each of these systems cause interferences to the other systems' reception. Additionally, intermodulation causes degradation of the LTE transmission links.

SUMMARY

Embodiments of the invention provide systems and methods for using channel quality reports to reduce inter-band interference according to one embodiment. Channel information is received at a first wireless communication device from a second wireless communication device. The first wireless device is operating in a first frequency range, and the second wireless device is operating in a second frequency range. The first frequency range is adjacent to the second frequency range. A channel quality report is generated at the first wireless communication device. The channel quality report indicates that particular sub-bands in the first frequency range have low channel quality. The particular sub-bands are selected using the channel information.

BRIEF DESCRIPTION OF THE DRAWINGS

Having thus described the invention in general terms, reference will now be made to the accompanying drawings, wherein:

FIG. 1 is a block diagram of a system implementing one embodiment.

FIG. 2 illustrates channels within an ISM band and LTE sub-bands.

Figure 3:
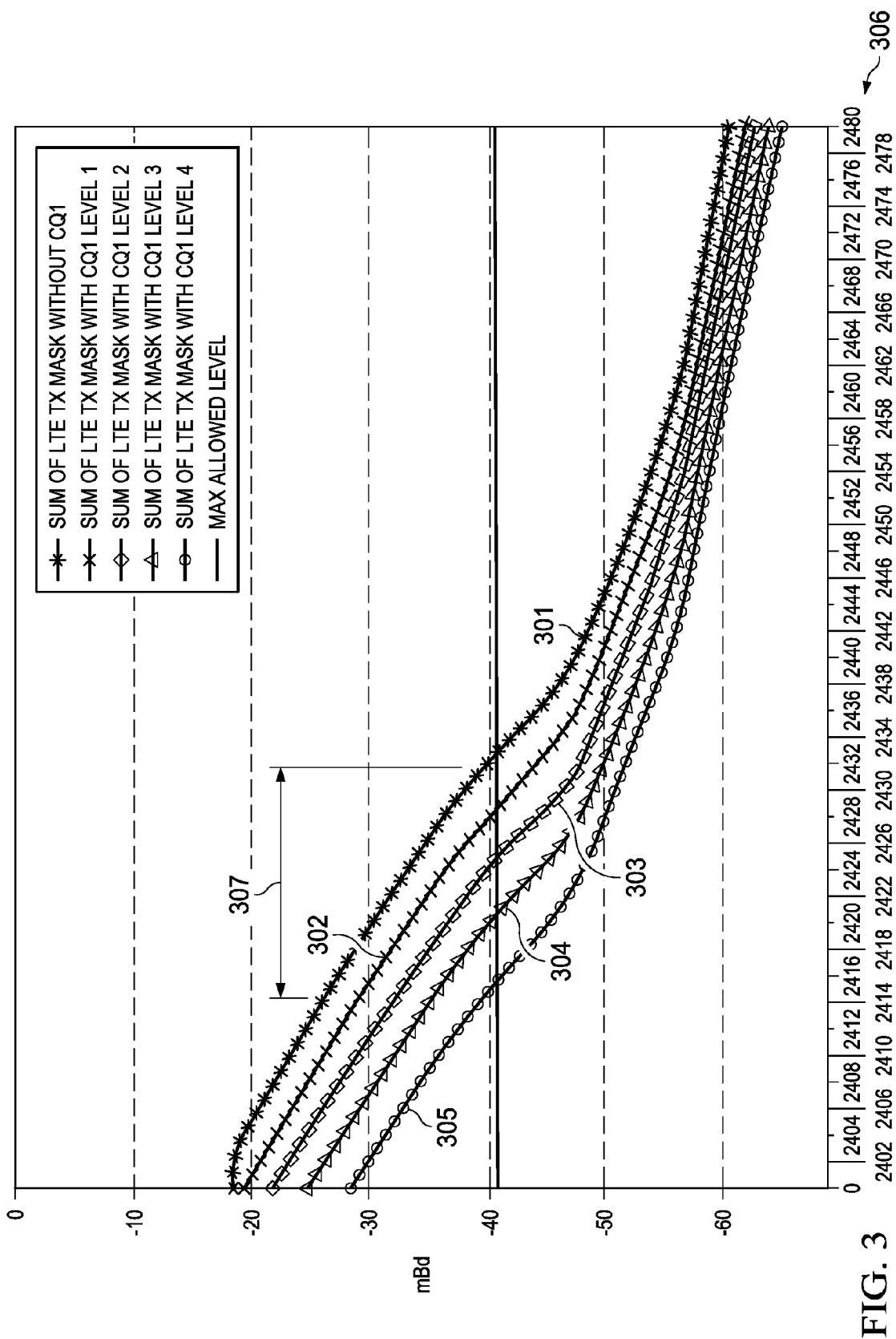

FIG. 3 illustrates the change in spectral emissions in the ISM band frequencies for different CQI reports.

FIG. 4 illustrates an alternative embodiment in which an LTE transceiver and an ISM band transceiver are in different devices.

Figure 5:
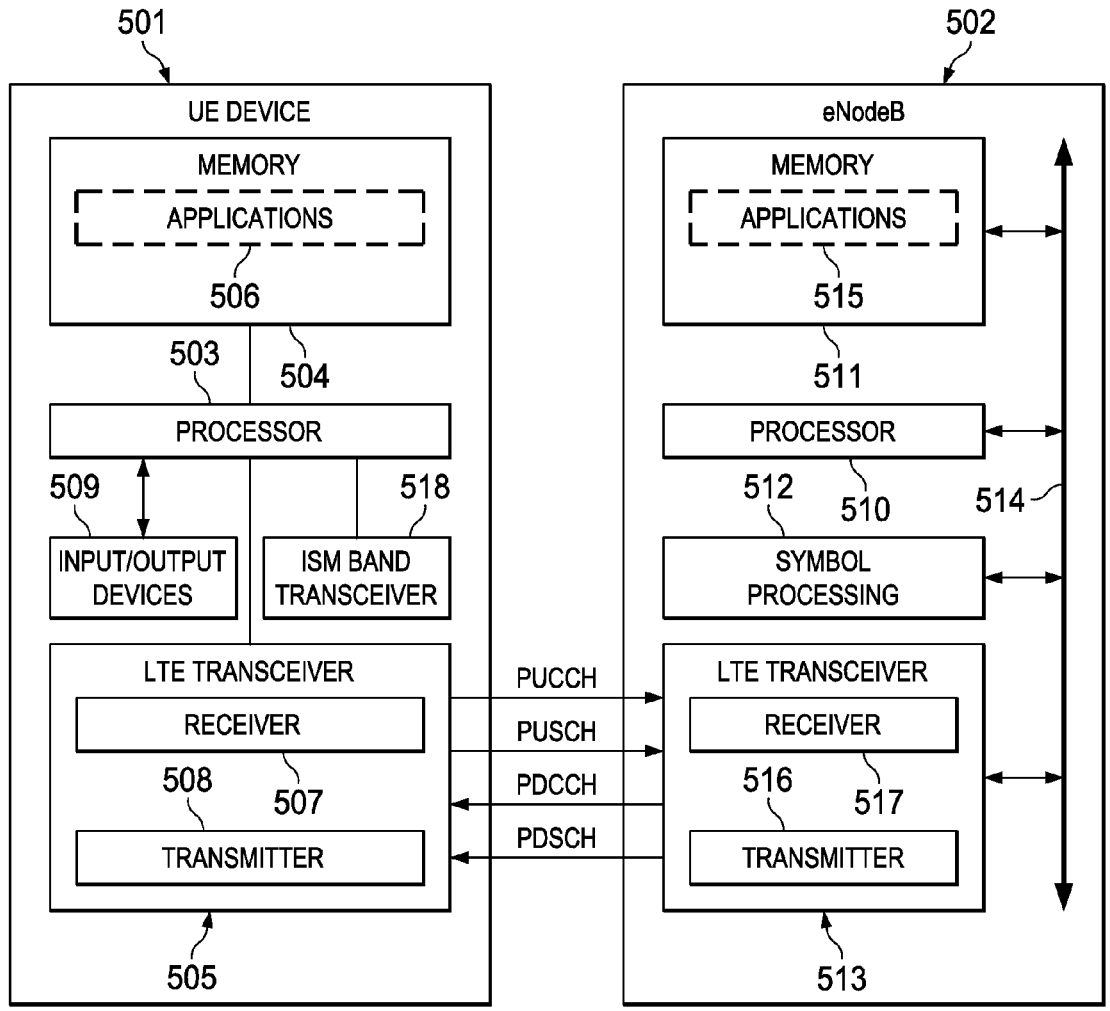

FIG. 5 is a block diagram illustrating internal details of a mobile UE and a base station, such as an LTE eNodeB, operating in a network system.

Figure 6:
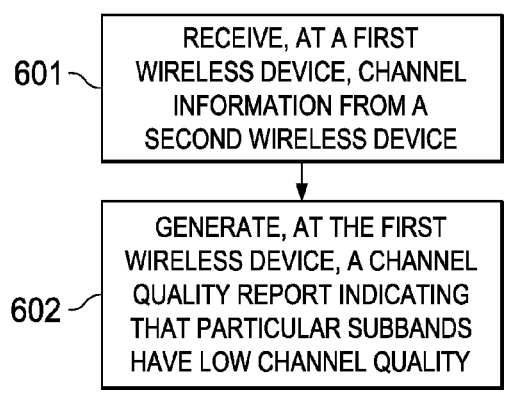

FIG. 6 is a flowchart illustrating a method for using channel quality reports to reduce inter-band interference according to one embodiment.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

When an LTE base station (eNodeB) or user equipment (UE) transmits on frequencies in the sub-bands that are adjacent to the ISM band, the LTE emissions significantly degrade WLAN and Bluetooth reception. Similarly, the WLAN and Bluetooth transmissions in the ISM band can degrade adjacent LTE sub-bands. The degradation is reflected in reduction of receiver sensitivity level and the maximum possible range between the transmitter and receiver of the degraded technology.

In a prior solution, this problem was addressed with a time domain solution that defines time slots for transmission by Bluetooth and WLAN devices. In this solution, the LTE devices avoid transmissions in the timeslots that are assigned to Bluetooth and WLAN devices. Similarly, other timeslots may be assigned to LTE devices and designated for avoidance by Bluetooth and WLAN devices. This solution has significant disadvantages because it reduces network capacity and bandwidth for the LTE network and degrades system performance for the effected Bluetooth and WLAN devices. The time domain solution is overly complicated and reduces the available transmission times for one of the systems while drastically degrading network performance.

Another possible solution uses analog filtering to provide a high level of isolation in adjacent bands. The degree of isolation required to make this effective (e.g., approximately 60 dB at 20 MHz away from the pass band) is currently not possible. Even the best RF filters available are not capable of providing enough RF isolation Embodiments described herein provide a solution that applies to both Frequency-Division Duplexing (FDD) and Time-Division Duplexing (TDD) LTE technologies while improving both WLAN and Bluetooth networks. LTE Channel Quality Indication (CQI) reports from UEs to the eNodeB are used to reduce transmissions in the sub-bands that are adjacent to the ISM band and thereby reduce emissions into both the ISM and LTE band. The number of sub-bands reported via CQI may be determined based upon the bandwidth size that has been interrupted over the ISM band. Such a solution is simple to apply and does not require any protocol or design changes to apply to both FDD and TDD LTE technologies.

FIG. 1 is a block diagram of a system implementing one embodiment. User equipment (UE) device 101 is capable of transmitting on both LTE bands and ISM bands. LTE transceiver 102 is used to generate and transmit signals on LTE channels to LTE eNodeB 103. LTE transceiver 102 also processes signals received on LTE channels from LTE eNodeB 103. LTE eNodeB 103 directs which sub-bands are used by LTE device 101. Device 101 sends periodic and/or aperiodic CQI reports to eNodeB 103. The CQI reports tell the eNodeB scheduler what data rate the UE expects to be able to receive and are used by the eNodeB 103 to assign sub-bands to UE device 101.

The periodic CQI report is carried by the Physical Uplink Control Channel (PUCCH). But if UE device 101 needs to send uplink (UL) data in the same subframe as a scheduled periodic CQI report, the periodic CQI report will use the Physical Uplink Shared Channel (PUSCH) together with the UL data transmission since the UE cannot transmit on both PUCCH and PUSCH simultaneously. In order to get a more detailed CQI report, eNodeB 103 can trigger an aperiodic CQI report when needed. The aperiodic CQI report is transmitted on PUSCH, either alone or together with UL data.

The CQI report can be divided into three levels: wideband, UE-selected subband, and higher layer configured subband. The wideband report provides one CQI value for the entire downlink system bandwidth. The UE-selected subband CQI report divides the system bandwidth into multiple subbands, selects a set of preferred subbands (the best M subbands), then reports one CQI value for the wideband and one differential CQI value for the set (assume transmission only over the selected M subbands). The higher layer configured subband report provides the highest granularity. It divides the entire system bandwidth into multiple subbands, then reports one wideband CQI value and multiple differential CQI values, one for each subband.

UE device 101 also includes an ISM band transceiver 104 for communication with other ISM band devices 105. The ISM band transceiver 104 and ISM band device 105 may communicate using the Bluetooth standard or the IEEE 802.11 WiFi standard, for example. Communication in the ISM band may use any other appropriate standard, such as the ZigBee protocol, the IEEE 802.15 standard, or any other standard or protocol supporting Wireless Personal Area Networks (WPANs) or WLANs.

LTE transceiver 102 and ISM band transceiver 104 may be different chipsets in the same UE device 101, for example. UE device 101 also includes a controller 106, which may be a microprocessor based device for controlling the operation of the LTE transceiver 102 and ISM band transceiver 104. Controller 106 may monitor what bands/sub-bands are assigned to UE device 101 and measure interference on assigned bands/sub-bands and adjacent bands. For example, referring to FIG. 2, UE device 101 may communicate with ISM device 105 on assigned channels within ISM band 201. UE device 101 may also be assigned to use one or more LTE sub-bands 202-206 for uplink and downlink communications with LTE eNodeB 103.

Controller 106 and ISM band transceiver in UE device 101 may monitor and detect noise and channel degradation in the ISM band that is caused by LTE transmissions in adjacent sub-bands. By reshaping the LTE transmissions, the noise level in the ISM band may be reduced sufficiently to allow full performance of ISM band device 105, such as a WLAN and Bluetooth device, without degrading LTE performance.

UE device 101 can take into account the degradation on the ISM adjacent channel when generating CQI reports to LTE eNodeB 103. UE device 101 uses sub-band CQI reports to eNodeB 103 to reflect bad channel conditions on the sub-bands 202-206 adjacent to ISM band 201. As a result, LTE eNodeB 103 will avoid scheduling the adjacent subband and mutual interference will be significantly degraded. For example, the UE device 101 may report poor CQI for the sub-bands that are needed by ISM band devices. Knowing the channel being used by the ISM band transceiver 104, the UE device 101 may calculate the degradation caused by transmissions on adjacent LTE sub-band and generate CQI reports that indicate the sub-bands should be avoided. The eNodeB 103 will respond by assigning other non-adjacent sub-bands to UE device 101.

The CQI report can be correlated to feedback from ISM band device 105 and/or ISM band transceiver 104 regarding the severity and degradation in ISM system performance. In one embodiment, the reports range from 1 to 4, wherein a level 1 request corresponds to a reduction of 4 MHz in the adjacent LTE band. This is equivalent to moving the LTE transmission twenty-four Resource Blocks (RB) away from the ISM band and increasing spectral isolation.

FIG. 3 illustrates the change in spectral emissions 301-305 in the ISM band frequencies 306 for different CQI reports. Traces 301-305 are examples of the sums of interfering LTE transmissions from adjacent sub-bands. Channel 307 represents a 20 MHz WLAN channel, for example. As illustrated, the LTE transmissions 301 from adjacent subbands exceed −40 dBm are degrading the WLAN channel 307. A WLAN device, such as ISM device 105, or an ISM band transceiver 104 may detect this LTE interference in channel 307 and notify a UE device, such as device 101. UE device 101 generates a CQI report that will result in the LTE eNodeB assigning LTE sub-bands that will minimize the degradation of WLAN channel 307. Initially, the LTE transmission without CQI adjustments 301 may cause interference in WLAN channel 307. That interference is minimized by the UE device sending CQI reports that cause the eNodeB to avoid adjacent LTE sub-bands. In the case where a CQI level-4 report is sent, the LTE transmission 305 is reduced to below −40 dBm in the WLAN channel 307.

The LTE emissions into the ISM band are reduced by shaping the LTE transmission. This allows uninterrupted receive time for the ISM band users. This technique allows the LTE and ISM band systems to all achieving full system performance without influencing downlink bandwidth of the LTE network. The CQI report method of reducing emissions in the ISM band can be implemented protocol changes to any of the systems.

FIG. 4 illustrates an alternative embodiment in which an LTE transceiver 401 and an ISM band transceiver 402 are in different devices. LTE UE device 403 includes LTE transceiver 401 and controller 404. LTE UE device 403 communicates with LTE eNodeB base station 405 on assigned LTE sub-bands.

ISM band UE device 406 includes ISM band transceiver 402 and controller 407. ISM band UE device 406 communicates with other ISM band devices 408, such as Bluetooth, WiFi, or ZigBee devices, using channels assigned in the ISM band.

Although LTE transceiver 401 and ISM band transceiver 402 are in different UE devices 403, 406, they may communicate channel interference information between them over a separate link 409. In one embodiment, controllers 404 and 407 communicate over link 409 to exchange channel assignment and/or channel degradation information. Link 409 may be any wireless or wired connection between devices 403 and 406 that allows LTE UE device 403 to receive channel information from ISM UE device 406. LTE UE device 403 then uses the channel information to generate CQI reports that will cause LTE eNodeB 405 to assign sub-bands adjacent to the ISM band in a manner that minimizes interference.

Although the examples used herein refer to the ISM band, it will be understood that the present invention is frequency-band agnostic and applies to any frequency band. For example, proposals for LTE Advanced in unlicensed spectrum (LTE-U) suggest that both LTE systems and WiFi WLANs would operate in the 5 GHz unlicensed band. The present invention may be used to minimize interference between WLANs operating in the 5 GHz unlicensed band and LTE UEs operating in the 5 GHz unlicensed band or in adjacent bands.

FIG. 5 is a block diagram illustrating internal details of a mobile UE 501 and a base station 503, such as an LTE eNodeB, operating in a network system. Mobile UE 501 may represent any of a variety of devices such as a server, a desktop computer, a laptop computer, a cellular phone, a Personal Digital Assistant (PDA), a smart phone or other electronic devices. In some embodiments, the electronic mobile UE 501 communicates with eNodeB 502 based on a LTE or Evolved Universal Terrestrial Radio Access (E-UTRA) protocol. Alternatively, another communication protocol now known or later developed can be used.

Mobile UE 501 comprises a processor 503 coupled to a memory 504 and a transceiver 505. The memory 504 stores (software) applications 506 for execution by the processor 503. The applications could comprise any known or future application useful for individuals or organizations. These applications could be categorized as operating systems (OS), device drivers, databases, multimedia tools, presentation tools, Internet browsers, emailers, Voice-Over-Internet Protocol (VOIP) tools, file browsers, firewalls, instant messaging, finance tools, games, word processors or other categories. Regardless of the exact nature of the applications, at least some of the applications may direct the mobile UE 501 to transmit UL signals to eNodeB (base station) 502 periodically or continuously via the transceiver 505.

Transceiver 505 includes uplink logic which may be implemented by execution of instructions that control the operation of the transceiver. Some of these instructions may be stored in memory 504 and executed when needed by processor 503. As would be understood by one of skill in the art, the components of the uplink logic may involve the physical (PHY) layer and/or the Media Access Control (MAC) layer of the transceiver 505. Transceiver 505 includes one or more receivers 507 and one or more transmitters 508.

Processor 503 may send or receive data to various input/output devices 509. A subscriber identity module (SIM) card stores and retrieves information used for making calls via the cellular system. Processor 503 may send information to a display unit for interaction with a user of mobile UE 501 during a call process. The display may also display pictures received from the network, from a local camera, or from other sources such as a Universal Serial Bus (USB) connector. Processor 503 may also send a video stream to the display that is received from various sources such as the cellular network via RF transceiver 505 or the camera.

Mobile UE 501 also includes an ISM band transceiver 518 that is used to communicate with other devices over channels assigned in the ISM band using standards or protocols adapted for the ISM band, such as Bluetooth, WiFi, or ZigBee. ISM band transceiver 518 provides channel information to processor 503, which in turn generates CQI reports for transmission to eNodeB 502 via LTE transmitter 505.

In one embodiment, UE 501 receives interference parameters from base station 502. Processor 503 uses the interference parameters to identify and suppress interference signals received at receiver 507.

eNodeB 502 comprises a processor 510 coupled to a memory 511, symbol processing circuitry 512, and a transceiver 513 via backplane bus 514. The memory stores applications 515 for execution by processor 510. The applications could comprise any known or future application useful for managing wireless communications. At least some of the applications 515 may direct eNodeB 502 to manage transmissions to or from mobile UE 501.

Transceiver 513 comprises an uplink resource manager, which enables eNodeB 502 to selectively allocate uplink PUSCH resources to mobile UE 501. As would be understood by one of skill in the art, the components of the uplink resource manager may involve the physical (PHY) layer and/or the Media Access Control (MAC) layer of the transceiver 513. Transceiver 513 includes at least one receiver 515 for receiving transmissions from various UEs within range of eNodeB 502 and at least one transmitter 516 for transmitting data and control information to the various UEs within range of eNodeB 502. Symbol processing circuitry 512 performs demodulation using known techniques. Random access signals are demodulated in symbol processing circuitry 512.

The uplink resource manager executes instructions that control the operation of transceiver 513. Some of these instructions may be located in memory 511 and executed when needed on processor 510. The resource manager controls the transmission resources allocated to each UE 501 served by eNodeB 502 and broadcasts control information via the PDCCH. UE 501 may receive TTD UL/DL configuration instructions from eNodeB 502.

FIG. 6 is a flowchart illustrating a method for using channel quality reports to reduce inter-band interference according to one embodiment. In step 601, channel information is received at a first wireless communication device from a second wireless communication device. The first wireless device is operating in a first frequency range, and the second wireless device is operating in a second frequency range. The first frequency range is adjacent to the second frequency range. In step 602, a channel quality report is generated at the first wireless communication device. The channel quality report indicates that particular sub-bands in the first frequency range have low channel quality. The particular sub-bands are selected using the channel information.

In one embodiment, the channel information is an operating channel assigned to the second wireless communication device. The particular sub-bands may be selected because transmissions in the sub-bands would degrade communications or cause interference in the operating channel.

The first wireless communication device may be, for example, an LTE UE, and the second wireless communication device operates in the ISM frequency range. The second wireless communication device may comply with the Bluetooth standard, an IEEE 802.11 standard, an IEEE 802.15 standard, and the ZigBee standard.

In one embodiment, the first wireless communication device and the second wireless communication device are different circuits within a single UE device.

A system for using channel quality reports to reduce inter-band interference comprises a first wireless communication circuit configured to operate in a first frequency range according to a first standard, and a second wireless communication circuit configured to operate in a second frequency range according to a second standard. The first frequency range is adjacent to the second frequency range. The system also comprises a controller configured to generate a channel quality report according to the first standard. The channel quality report indicates that particular sub-bands in the first frequency range have low channel quality, where the particular sub-bands are selected using channel information received from the second wireless communication device.

The channel information may identify an operating band assigned to the second wireless communication circuit. The sub-bands may be selected because transmissions in the particular sub-bands would degrade communications in the operating band.

The first standard may be an LTE wireless communication standard, and the channel quality report may be an LTE CQI report. The second standard may be one of the Bluetooth standard, an IEEE 802.11 standard, an IEEE 802.15 standard, and the ZigBee standard. The second frequency range may be the ISM band.

The first and second wireless communication circuits may be components of the same UE device. Alternatively, the first and second wireless communication circuits may be components of the different UE devices. The system may include a communication link between the first and second wireless communication circuits, wherein the communication link is adapted to pass channel information.

A UE according to one embodiment may comprise an LTE communication circuit, an ISM band communication circuit, and a controller configured to generate LTE Channel Quality Indication (CQI) reports, wherein the content of the CQI reports is selected using channel information associated with an ISM band channel assigned to the ISM band communication circuit. The CQI reports may intentionally misidentify poor channel quality in selected LTE sub-bands because transmissions in the selected sub-bands would degrade communications in the assigned ISM band channel.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method, comprising:
receiving, at a first wireless communication device operating in a first frequency band, channel information from a second wireless communication device operating in a second frequency band, wherein the first frequency band is adjacent to the second frequency band;
generating a channel quality report at the first wireless communication device, the channel quality report indicating that particular sub-bands in the first frequency band have low channel quality, wherein the particular sub-bands are selected using the channel information; and
receiving, at the first wireless communication device, a sub-band assignment within the first frequency band.

2. The method of claim 1, wherein the channel information comprises an operating channel assigned to the second wireless communication device.

3. The method of claim 2, wherein the particular sub-bands are selected because transmissions in the sub-bands would degrade communications in the operating channel.

4. The method of claim 1, wherein the particular sub-bands are selected because transmissions in the sub-bands would cause interference in the operating channel.

5. The method of claim 1, wherein the first wireless communication device is a Long Term Evolution (LTE) user equipment (UE), and the second wireless communication device operates in an Industrial, Scientific and Medical (ISM) frequency band.

6. The method of claim 1, wherein the first wireless communication device is a Long Term Evolution (LTE) user equipment (UE), and the second wireless communication device operates in an unlicensed frequency band.

7. The method of claim 5, wherein the second wireless communication device complies with a standard selected from the group consisting of a Bluetooth standard, an IEEE 802.11 standard, an IEEE 802.15 standard, and a ZigBee standard.

8. The method of claim 1, wherein the first wireless communication device and the second wireless communication device are different circuits within a user equipment (UE) device.

9. A system, comprising:
a first wireless communication circuit configured to operate in a first frequency band according to a first standard;
a second wireless communication circuit configured to operate in a second frequency band according to a second standard, wherein the first frequency band is adjacent to the second frequency band; and
a controller configured to generate a channel quality report according to the first standard, the channel quality report indicating that particular sub-bands in the first frequency band have low channel quality, wherein the particular sub-bands are selected using channel information received from the second wireless communication circuit, the controller further configured to receive a sub-band assignment within the first frequency band.

10. The system of claim 9, wherein the channel information identifies an operating band assigned to the second wireless communication circuit.

11. The system of claim 10, wherein the sub-bands are selected because transmissions in the particular sub-bands would degrade communications in the operating band.

12. The system of claim 9, wherein the first standard is a Long Term Evolution (LTE) wireless communication standard, and the second standard is selected from the group consisting of a Bluetooth standard, an IEEE 802.11 standard, an IEEE 802.15 standard, and a ZigBee standard.

13. The system of claim 9, wherein the second frequency band is an Industrial, Scientific and Medical (ISM) band.

14. The system of claim 9, wherein the second frequency band is an unlicensed frequency band.

15. The system of claim 9, wherein the channel quality report is a Long Term Evolution (LTE) Channel Quality Indication (CQI) report.

16. The system of claim 9, wherein the first wireless communication circuit and the second wireless communication circuit are components of the same user equipment (UE) device.

17. The system of claim 9, wherein the first wireless communication circuit and the second wireless communication circuit are components of the different user equipment (UE) devices.

18. The system of claim 17, further comprising:
a communication link between the first wireless communication circuit and the second wireless communication circuit, the communication link adapted to pass channel information from the second wireless communication circuit to the first wireless communication circuit.

* * * * *